United States Patent Office 3,441,670
Patented Apr. 29, 1969

3,441,670

BLACK LEVEL CONTROL CIRCUIT FOR A TELEVISION RECEIVER

Bernard D. Loughlin, Centerport, N.Y., assignor to Hazeltine Research, Inc., a corporation of Illinois Continuation of application Ser. No. 223,347, Sept. 13, 1962. This application Jan. 20, 1966, Ser. No. 526,945
Int. Cl. H04n 3/16, 5/44
U.S. Cl. 178—7.5 7 Claims

ABSTRACT OF THE DISCLOSURE

A reference level or black level control circuit is provided in a television receiver for controlling the CRT beam current. The control circuit is series connected in the CRT D.C. beam current path and both are supplied with a television signal via an A.C. coupled path. The control circuit is responsive to the average value of the A.C. video component of the television signal and maintains an average value of CRT beam current which is in accordance with the detected average value of the video signal.

Figures 1, 3:
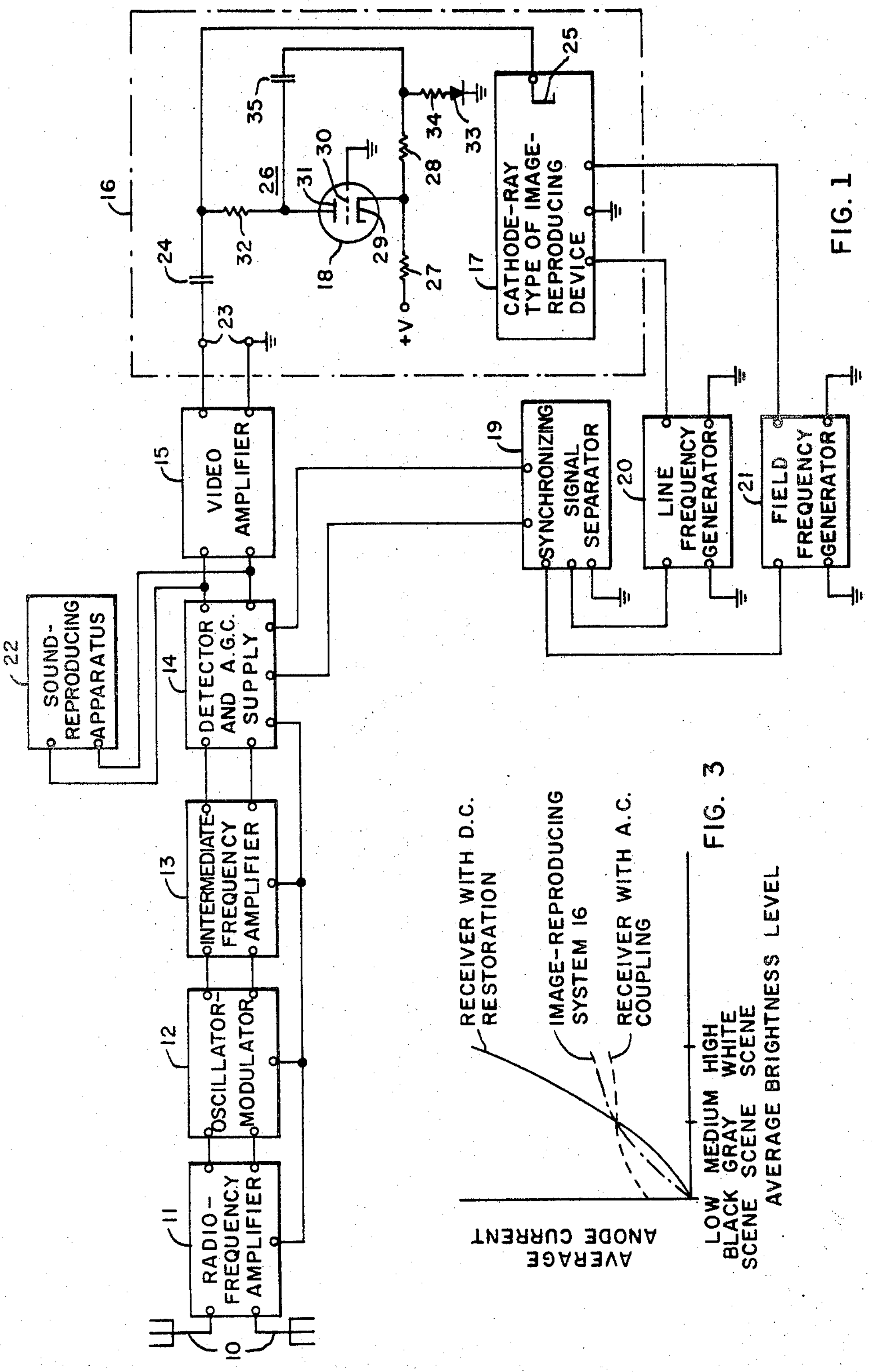

This is a continuation of application Ser. No. 223,347, filed Sept. 13, 1962, now U.S. Patent No. 3,089,427.

The present invention relates to a television receiver image-reproducing system and is particularly directed to the improvement of the brightness contrast characteristic of such a system.

The television signal transmitted is a composite signal comprising a carrier wave signal modulated with direct-current (D-C) and alternating-current (A-C) components during the recurring trace portion of the television transmission and with synchronizing signal components during the intervening retrace portion. For accurate reproduction of this transmitted television picture image, a stable reference level thereof, such as the black level, should be maintained. Accurate reproduction of the transmitted picture image implies that the D-C and A-C components of the television signal are present at the image-reproducing device after translation through the television receiver. In receivers utilizing capacitive coupling arrangements between stages following the video detector, reference or black level stabilization can be used to restore the otherwise lost D-C components, representative of the background illumination, in the signal applied to the reproducing device.

Furthermore, this reference level should be stabilized in such a manner that signals representing scenes of different average brightness values will be reproduced with their proper shade value, with respect to the reference level, in the reproduced image.

In one form of receiver known heretofore, signal stabilization of the reference level is maintained through a diode circuit which is D-C coupled to the input of the picture reproducing device and which peak rectifies the synchronizing components of the detected picture signal, thereby stabilizing this signal with respect to its synchronizing peaks. Such an arrangement does effect stabilization but can create two additional problems that should be corrected for comfortable viewing. These two difficulties relate to impulse noise and overloading of the high voltage power supply.

The basic noise problem created in receivers using the peak rectifying type of D-C restoration results when negative modulation is employed in the transmission of the picture signal because large amplitude impulse noise can produce very large impulses in the black direction of the signal. A peak detecting D-C restorer, which conducts on the synchronizing signal peaks has a fast charge time constant in the black direction, and attempts to peak detect this large amplitude of noise and thereby "set up" on the noise. These noise spikes may conceivably be sufficient in magnitude that the peak detected signal turns the television screen white.

High voltage power supply overload is not normally a problem in image-reproducing systems employing A-C coupling between the video output stage and the cathode-ray type reproducing device. The A-C coupling arrangement enables the picture tube average anode or beam current to remain fairly constant at a level which can be adjusted so that the current capability of the high voltage power supply is not exceeded, regardless of the average brightness value of the transmitted picture signal. However, A-C coupling proves unsatisfactory if both low average brightness and high average brightness signals are to have their proper shade value in the reproduced image. The use of a D-C restorer, while providing signal stabilization, allows for a drastically varying picture tube anode current capable of reaching a value on the occasional scene of high average brightness value, which may be sufficient to overload the high voltage power supply. To prevent such overloading the viewer may turn down the contrast control, but this reduces the average brightness of the reproduced image on all scenes.

Another problem that results is due to the fact that individual cathode-ray tubes of the same type often differ in their beam current cutoff characteristics. For a given unidirectional voltage applied to the anode of the cathode-ray tube, there exists a unidirectional grid-to-cathode voltage just sufficient to cut off the stream of electrons from the cathode from reaching the phosphorescent screen. This cutoff voltage may be different among cathode-ray tubes of the same type classification necessitating the incorporation of a brightness control to provide for a selected degree of screen illumination for any given picture signal.

It is therefore an object of the present invention to provide an image-reproducing system for a television receiver that maintains black level in the reproduced image, such that most television picture signals will have their correct shade value therein.

It is another object of the invention to provide an image-reproducing system for a television receiver that maintains black level in the reproduced image, is unaffected by impulse noise, and does not overload the high voltage power supply, regardless of the average brightness value of the transmitted picture signal.

It is also an object of the present invention to provide an image-reproducing system for a television receiver that eliminates the need for a brightness control.

In accordance with the invention, an image-reproducing system for a television receiver, comprises means for supplying a television signal including a synchronizing interval and an image-representative interval having alternating-current components and a direct-current component. The invention also comprises means, including a cathode-ray tube having an external beam current path, for reproducing the image and means for coupling only the alternating-current components to the image-reproducing means. The invention further comprises control means, including a detector circuit in the beam current path and responsive to the alternating-current components, for controlling beam current conduction in the path to effectively maintain black level in the reproduced image over a predetermined range of average brightness level variations in the television signal.

For a better understanding of the present invention together with other and further objects thereof, reference is had to the following description taken in connection with the accompanying drawings, and its scope will be pointed out in the appended claims.

Referring to the drawings:

FIG. 1 is a circuit diagram, partly schematic, of a television receiver embodying a particular form of the present invention;

FIGS. 2*a* through 2*d* inclusive comprise graphs useful in explaining the operation of the invention, and FIG. 3 comprises a series of curves illustrating a result of the invention.

*General*

Referring now more particularly to FIG. 1, there is represented a television receiver of the superheterodyne type having an antenna system 10 coupled to a radio-frequency amplifier 11 of one or more stages. Coupled to the output terminals of amplifier 11, in a cascade fashion and in the order presented, are an oscillator-modulator 12, an intermediate-frequency amplifier 13 of one or more stages, a detector and automatic-gain-control (AGC) supply 14, a video amplifier 15, and an image-reproducing system 16 constructed in accordance with the present invention and to be described in greater detail hereinafter. Briefly, however, system 16 includes a cathode-ray type of image-reproducing device 17, and a circuit including tube 18 for controlling beam current in such a manner as to stabilize the supplied television signal and to eliminate the need for the usual brightness control in a manner to be more particularly described hereinafter. A synchronizing signal separator 19, having output terminals coupled to a line frequency generator 20 and a field frequency generator 21, is also coupled to detector 14. The output terminals of these scanning generators are connected to the cathode-ray tube 17 to control beam deflection. The output of the AGC supply in unit 14 is connected to one or more of the stages of radio-frequency amplifier 11, oscillator-modulator 12, and intermediate-frequency amplifier 13, in a conventional manner.

A sound-reproducing apparatus 22 is connected to the output terminals of detector 14 for reproducing the sound portion of the transmitted television signal.

It will be understood that the units thus far described, with the exception of system 16, are of conventional construction and well-known in the art, therefore, a further description thereof is unnecessary. Neglecting for a moment the specific operation of unit 16, the modulated carrier wave signal desired is intercepted by the antenna system 10 of the television receiver. This signal is selected and amplified in radio-frequency amplifier 11 and applied to oscillator-modulator 12 wherein it is converted to an intermediate-frequency signal. Intermediate-frequency amplifier 13 amplifies this signal and impresses it upon detector 14, deriving the modulation components thereof. These modulation components, comprising an image-representative portion as well as a synchronizing portion, are applied to video amplifier 15 for amplification and then to input terminals 23 of image-reproducing system 16, wherein cathode-ray tube 17 and the control circuit including tube 18 cooperate to reproduce the image in a novel manner to be described subsequently.

The synchronizing signal components of the detected signal are separated from the video-frequency components in the synchronizing signal separator 19 and are used to synchronize the line frequency generator and field frequency generator 20 and 21, respectively. These generators produce scanning signals of sawtooth waveform which are properly synchronized with respect to the received television picture signal and are applied to the cathode-ray type image-reproducing device 17 to deflect the beam in two directions normal to each other, to reproduce the received television image.

The AGC developed output signal of unit 14 is employed to control the degree of amplification of one or more of the units 11, 12 and 13, such that the signal presented to detector 14 is maintained within a narrow intensity range for a wide range of received signal intensities.

Accompanying the television picture modulated carrier wave is a sound signal modulated carrier wave which is also intercepted by antenna system 10. This sound signal is selected and amplified in radio-frequency amplifier 11 and applied to oscillator-modulator 12 wherein it is converted to an intermediate-frequency signal. Intermediate-frequency amplifier 13 amplifies this sound modulated signal and impresses it upon detector 14, wherein a sound modulated intercarrier beat note component is derived. This derived signal is then presented to sound-reproducing apparatus 22 for amplification, demodulation, and reproduction by the sound-reproducing device.

*Image-reproducing system 16*

Referring now more particularly to the image-reproducing system 16 which embodies one form of the present invention, the arrangement there represented comprises means including input terminals 23 for supplying a television signal including an image-representative portion having A-C components and a D-C component. Means including cathode-ray tube 17 are provided in system 16 for reproducing the image-representative portion of the television signal. System 16 also includes means for coupling the A-C components of the above-mentioned television signal to cathode-ray tube 17. This is accomplished by connecting capacitor 24 between input terminals 23 and cathode 25 of cathode-ray tube 17.

Image-reproducing system 16 further includes means 26 coupled in the beam current path of cathode-ray tube 17 and being responsive to the applied signal during at least the image-representative interval for deriving a control effect which is used to control beam current conduction to effectively maintain black level in the reproduced image over a predetermined range of brightness levels in the image signal, regardless of variations in the cutoff characteristic of tube 17. For example, this range of brightness levels may be a restricted range extending from black in the image to some intermediate level of average brightness. Thus, black level may be maintained on low average brightness levels and be suppressed to some degree over the remaining range of average brightness levels, in this case on high average brightness. Specifically, means 26 includes an average detector circuit having a vacuum tube 18 coupled from the cathode 25 of tube 17 to ground and providing a direct-current path for the beam current whereby the beam current may be controlled. The control electrode 30 of the tube 18 is connected to ground and the anode 31 of the tube is D-C coupled to cathode 25 through resistor 32, such that the D-C potential present at cathode 25 acts as the B+ supply voltage for vacuum tube 18. A voltage divider network, consisting of resistors 27, 28, and 34, and diode 33 is employed to develop a bias voltage for the detector circuit and applies this voltage to the cathode 29 of tube 18. The end of resistor 27, remote from resistor 28, is directly connected to a source of bias potential +V. Means 26 also includes a nonlinear circuit, represented by diode 33, capacitively coupled to cathode 25 of cathode-ray tube 17 through resistor 34, capacitor 35, and resistor 32. The end of resistor 28, remote from resistor 27, is connected to one end of resistor 34, and to one side of capacitor 35, the other side of which is connected to vacuum tube anode 31. The opposite end of resistor 34 is connected to the anode of diode 33, its cathode being at ground potential. Aforementioned means 26 is utilized for detecting the average brightness value of the supplied image signal and for controlling beam current in cathode-ray tube 17 to effect a satisfactory D-C restoration characteristic. However, as will be described hereinafter, this average detection action may be somewhat modified by the peak value of the signal by suitable choice of resistors 28 and 34.

The manner in which cathode-ray tube 17 is connected to the rest of the image-reproducing system, i.e., A-C coupled to the output of video amplifier 15 through capacitor 24 and D-C coupled to the averaging type of D-C restorer, which is also A-C coupled to the output of the video amplifier 15, provides for effectively maintaining black level in the reproduced image over at least a range of average brightness level variations in the image signal. This range of average brightness variations extends from black to an intermediate level less than maximum white, such that D-C restoration is provided for scenes of low average brightness level, gradually changing to the equivalent of A-C coupling for scenes of high average brightness level. As a result, the possible problem of high voltage power supply overload on high average brightness scenes if D-C restoration were employed exclusively, is minimized.

In considering the operation of the image reproducing system just described, it will be seen that it is similar to conventional systems employing D-C restoration in that it restores the D-C component of the composite television signal to the signal applied to the reproducing device. The system differs from conventional reproducing systems, however, in that black level in the reproduced image is maintained only for scenes having a low average brightness level, the system deteriorating to the performance equivalent to A-C coupling for scenes having a high average brightness level. This may be more clearly understood by considering the operation of the system under specific operating conditions.

The signal presented to capacitor 24 in image-reproducing unit 16 by video amplifier unit 15 represents a demodulated television picture signal of either low, medium, or high average brightness level. Capacitor 24 couples the A-C components of the signal, representative of the transmitted picture image, to cathode 25 of cathode-ray tube 17 and blocks the D-C component present, representative of the background illumination in the signal, therefrom. Vacuum tube 18, resistors 27, 28, 32, and 34, capacitor 35, and diode 33 comprise an average detector type of D-C restorer which differs from the peak detecting variety in that it responds to the average value of the A-C input waveform rather than to its peak value. Furthermore, this average detector, which operates on the video signal, effectively detects only one side of the A-C axis, namely the negative side of the A-C axis, for the circuit shown. This video signal is applied to cathode 29 of vacuum tube 18 through the series circuit consisting of resistor 32, capacitor 35, and resistor 28. The voltage divider network consisting of resistors 27, 28, and 34, diode 33, and bias potential +V, establishes a positive voltage at cathode 29 which is sufficient to bias vacuum tube 18 to cutoff, with control grid 30 tied to ground, when no signal is present.

Figure 2C:
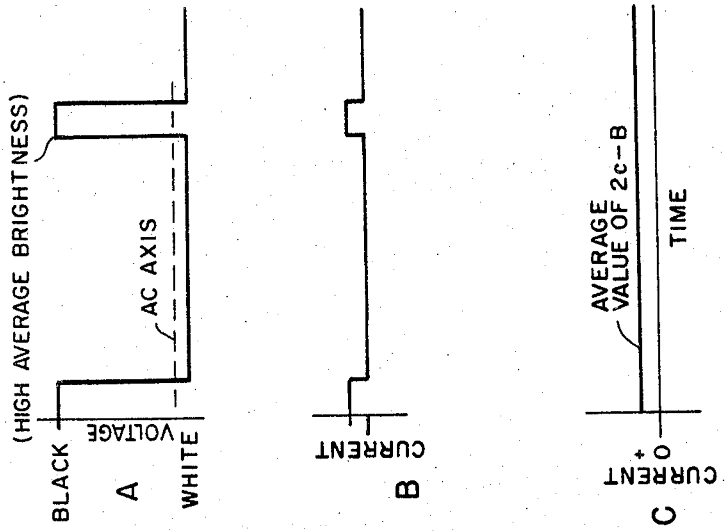
Figure 2B:
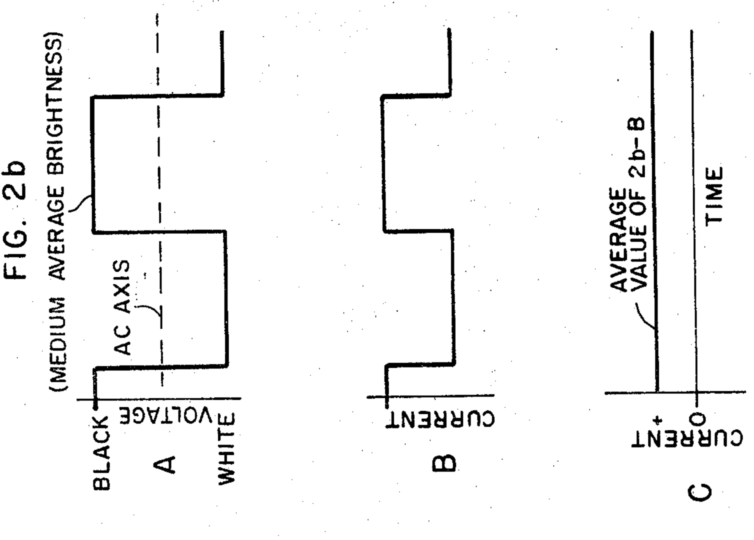
Figure 2A:
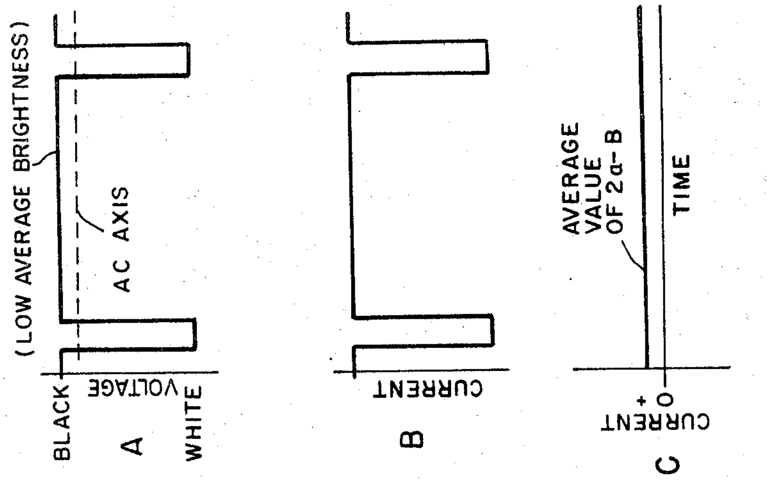
Figure 2D:
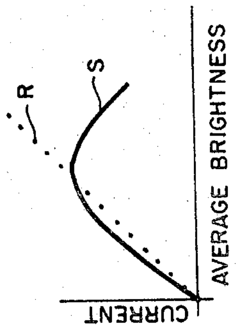

In order to understand the operation of image-reproducing system 16, it is instructive to consider a set of video signals having the idealized waveforms shown in FIGS. 2*a*–2*c*.

In FIG. 2*a*, A represents the image-representative portion of a television signal, for a scene having only black and white areas of such a duty factor to give a low average brightness level. For the sake of simplification and clarification, the synchronizing signal components have been omitted as they would not add materially in describing the operation of the invention. Since the demodulated television signal is applied to cathode 25 of cathode-ray tube 17, positive excursions of this signal will tend to cut off the tube, thereby preventing beam current from flowing. Pictorially this means that the bottom of the image-representative signals A shown in FIGS. 2*a*–2*c* correspond to white, while the top of the signals therein illustrated, correspond to black. As mentioned previously, average detection of this video signal is effected only upon one side of the A-C axis, that side being the negative side. When the video signal is on the negative side of the A-C axis, current cannot flow through diode 33 which is reverse biased but flows through vacuum tube 18. When the video signal is on the positive side of the A-C axis, however, current can flow through diode 33 which is now forward biased, and does not flow through tube 18 which is now cut off. The instantaneous value of current flowing in the cathode circuit of vacuum tube 18 is essentially equal to the video signal voltage, measured from the A-C axis and in the white direction as shown in FIG. 2*a*, A divided by the sum of the series resistances 32, 28. This instantaneous current in the cathode circuit is illustrated in FIG. 2*a*, B, and results in a current in the anode circuit whose D-C component represents an average detector action. This D-C anode current shown as C in FIG. 2*a* is equal to the value of the instantaneous cathode current times the duty factor for the idealized waveform under discussion. Since the duty factor of such a low average brightness scene is small, the anode current, which is the same as the average beam current of cathode-ray tube 17, is also of a small value.

In FIG. 2*b*, A represents the image-representative portion of a television signal for a scene having black and white areas of such a duty factor to give a medium average brightness level. The instantaneous cathode current, FIG. 2*b*, B, calculated in much the same manner as for a low average brightness scene, is somewhat less than that of FIG. 2*a*, B, due to the decrease in the peak value of the video voltage measured from the A-C axis toward the white level. However, because of the increase in duty factor, the average value of the anode current is increased, FIG. 2*b*, C.

In FIG. 2*c*, A represents the image-representative portion of a television signal, for a scene having black and white areas of such a duty factor to give a high average brightness level. The instantaneous cathode current and average anode current of vacuum tube 18 are depicted in FIG. 2*c*, B, and 2*c*, C, respectively, and are each less than their respective values for a medium average brightness scene. If many scenes of different average brightness levels are investigated, it will be found that average anode current varies as a function of average brightness in the general manner shown by S in FIG. 2*d*. It can be seen from this graph that the average current, although starting from zero on a scene of low average brightness value, is prevented from returning to zero on a high average brightness scene. This results because of the limitations imposed upon the duty cycle by signal blanking.

Because of the series connection, the average anode current of tube 18 is the same as the average beam current of cathode-ray tube 17. Thus, proper selection of average detector 26 parameters, such that this average anode current equals the value of average beam current tube 17 draws when black level is correctly displayed, results in D-C restoration accomplishment. However, if the average anode current is less than that necessary for correct black level operation, black in the transmitted scene will be suppressed in the reproduced image. Assuming correct black level reproduction, average beam current increases linearly with average brightness level of the idealized waveform as illustrated by R in FIG. 2*d*. Since the amplitude of the curvilinear portion S of that reproduction can be controlled by varying the parameters of circuit 26, the average anode current of tube 18 can be made to agree with the desired average image beam current for D-C restoraiton to be effected over at least a part of the average brightness range, viz, the low average brightness region.

From the above description of the invention it will be evident that the image-reproducing system embodying the invention has the advantage that by providing D-C restoration for scenes of low or medium average brightness, black level is effectively maintained in the reproduced image, whereas by providing only partial D-C restoration for scenes of high average brightness (decreasing portion of S in FIG. 2*d*), which effectively suppresses black level in the reproduced image, the problem of overload of the high voltage power supply is minimized. Since only a small percentage of scenes are of high average brightness level and since some suppression of black level on such scenes is subjectively tolerable, little is lost by not providing D-C restoration for such scenes.

To review the design interrelations of circuit 26 and image tube 17, consider a television receiver utilizing either D-C coupling or D-C restoration with the brightness control adjusted such that black level in the composite signal just cuts off the electron beam. Then the instantaneous value of cathode-ray tube beam current would be equal to the product of the peak value of the video signal, measured from black, and the transconductance of the picture tube. The average beam current would be equal to this instantaneous value times the duty factor of the composite signal.

Ideally, the average beam current necessary to maintain black level in the reproduced image using the series D-C restorer concept of this invention equals the average beam current in the above-cited D-C coupled or D-C restored receiver. Equating average anode current for tube 18 with that value of average beam current results in the fact that D-C restoration is achieved for low average brightness scenes with the idealized waveforms of FIGS. 2*a*–2*c* if the transconductance of cathode-ray tube 17 and the reciprocal of the sum of resistors 32, 28 are approximately equal. In a practical design the sum of resistors 32 and 28 would be made lower than that cited above so that D-C restoration would be approximated over a larger average brightness range.

If in the previous description it is considered that resistors 28 and 34 are equal, the current flowing in tube 18 is approximately the average of the waveform on one side of the A-C axis. This is so since, as diode 33 and tube 18 conduct alternately, the net resistance at the lower terminal of capacitor 35 remains approximately constant and is substantially independent of wave polarity. However, if resistors 28 and 34 are substantially unequal, the resultant resistance value will depend upon polarity and a type of peak detection action will result. In other words, the A-C axis will shift in response to the peak value of the wave, and, correspondingly, the conduction of tube 18 may not be limited to one side of the A-C axis, or may not occur over all voltage values on one side of the axis. As a result, the shape of the average anode current of tube 18 vs. the average brightness value curve, FIG. 2*d*, S, can be modified by changing the ratio of resistors 28 and 34 or by removing i.e., shorting, diode 33.

A suitable characteristic, particularly for less expensive receivers, can be obtained by removing diode 33 (shorting it) and making the value of resistor 34 equal to or less than the value of resistor 28. On the other hand an improved characteristic, embodying some peak detection action to modify the shape of curve S in FIG. 2*d*, results in using diode 33 if resistor 34 is less than resistor 28, perhaps even to the extent of shorting resistor 34.

FIG. 3 comprises a series of curves depicting the cathode-ray tube average anode current as a function of average scene brightness for a pure D-C restoration system, a system employing A-C coupling exclusively, and for the system 16 just described and which utilizes the present invention. It is evident that the curve representing the present invention displays the desired effects described above.

The invention has the additional advantage of being relatively immune to noise since the circuit operates on the average value of the video signal rather than on its peak value.

It will be noted from the description that the invention eliminates the need for a manual brightness control since the average beam current is set by tube 18 and not by image tube 17. This is an advantage both from the cost standpoint and the standpoint of ease of adjustment by the consumer. Thus, any cathode-ray tube of the same type classification can be employed in the television receiver without regard to its particular cutoff characteristic.

While applicant does not wish to be limited to any particular set of circuit constants, the following have proved useful in the circuit of FIG. 1:

| | |
|---|---|
| Resistor **27** ________________megohms__ | 1.2 |
| Resistor **28** __________________kilohms__ | 33 |
| Resistor **32** ______________________do____ | 18 |
| Resistor **34** _______________________ohms__ | Zero |
| Capacitor **24** ______________microfarads__ | 0.22 |
| Capacitor **35** _____________________do____ | 0.25 |
| Diode **33** ________________________________ | 1N34A |
| Voltage supply +V ______________volts__ | 265 |
| Vacuum tube **18** ________________________ | ½12AT7 |
| Cathode-ray tube **17** ____________________ | 21DEP4A |
| Bias on control grid of tube **17** _____volts__ | +105 |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image reproducing system for a television receiver, comprising:

means for supplying a television signal including a synchronizing interval and an image representative interval having alternating-current video components and a direct-current video component;

means, including a cathode-ray tube having an external beam current path, for reproducing said image;

means for coupling the alternating-current video components to said image reproducing means and a control means, and for preventing the coupling of said direct-current video component to said image reproducing means and said control means;

and said control means, including a detector circuit in said beam current path and responsive to said alternating-current video components, for controlling beam current conduction in said path in accordance with a detected value of said alternating-current video components to effectively maintain black level in the reproduced image over a predetermined range of average brightness level variations in the television signal.

2. An image reproducing system constructed according to claim 1 wherein said detector circuit is an average detector for detecting an average value of said alternating-current video components and wherein said control means controls beam current conduction in said path in accordance with the detected average value of said alternating-current video components.

3. Apparatus constructed in accordance with claim 1 wherein said control means controls average beam current conduction in said path, so as to effectively maintain black level in the reproduced image over a predetermined range of average brightness level variations which extends from black to an intermediate level of average brightness less than maximum white.

4. An image reproducing system constructed according to claim 1 wherein said means for coupling couples the alternating-current video components of said television signal to the cathode of said cathode-ray tube, and wherein said cathode-ray tube is subject to substantial variations in cutoff characteristics as between different tubes of the same type, and wherein said control means includes an average detector circuit in said beam current path and responsive to said alternating-current video components, said detector circuit including an electron device in series in said beam current path and direct-current coupled to the cathode of said cathode-ray tube, for detecting an average value of said alternating-current video components, for controlling beam current conduction in said path in accordance with the detected average value of said alternating-current video components to effectively maintain black level in the reproduced image over said predetermined range of average brightness level variations regardless of variations in cutoff characteristics of said cathode-ray tube.

5. An image-reproducing system constructed according to claim 4 wherein said control means controls average beam current conduction in said path so as to effectively maintain black level in the reproduced image over a predetermined range of average brightness level variations which extends from black to an intermediate level of average brightness less than maximum white.

6. An image reproducing system constructed according to claim 1 wherein said detector circuit is an average detector for detecting an average value of said alternating-current video components and having a vacuum tube direct-current coupled to the cathode of said cathode-ray tube so that the direct-current component of beam current flows through said vacuum tube, and wherein said control means additionally includes a peak detector coupled to said average detector circuit and responsive to said alternating-current video components for selectively altering the detection action of said average detector circuit in accordance with a peak detected value of said alternating-current video components.

7. An image-reproducing system constructed according to claim 6 wherein said control means controls average beam current conduction in said path so as to effectively maintain black level in the reproduced image over a predetermined range of average brightness level variations which extends from black to an intermediate level of average brightness less than maximum white.

References Cited

UNITED STATES PATENTS

| | | | |
|---|---|---|---|
| 2,825,758 | 3/1958 | Revercomb. | |
| 2,927,155 | 3/1960 | Godier. | |
| 3,309,462 | 3/1967 | Loughlin | 178—7.5 |

ROBERT L. GRIFFIN, *Primary Examiner.*

ROBERT L. RICHARDSON, *Assistant Examiner.*